UNITED STATES PATENT OFFICE.

WILLIAM J. BURLEIGH, OF ROME, NEW YORK.

IMPROVEMENT IN THE MANUFACTURE OF STARCH-POLISH.

Specification forming part of Letters Patent No. 151,085, dated May 19, 1874; application filed May 1, 1874.

*To all whom it may concern:*

Be it known that I, WILLIAM J. BURLEIGH, of Rome, in the county of Oneida and State of New York, have invented certain new and useful Improvements in the Composition and Manufacture of Starch-Polish, of which the following is a specification:

In order to enable others to make and use the same, I will now proceed to describe the ingredients of my invention, and the method of its composition, together with the manner of using it.

It is composed of white wax, spermaceti, castor-oil, mutton-tallow, borax, salt, gum-arabic, and isinglass.

I compound my starch-polish in the following manner:

Take cold water sufficient to dissolve the isinglass and gum-arabic. After these two substances are thoroughly dissolved, add all the other ingredients to the mixture. Then put the composition into a pan or other suitable dish and heat over a slow fire. When it is melted it is then poured into molds to form cakes of any desired form.

My starch-polish is used as follows: Wet the starch with cold soft water; then put in a piece of the polish of the size of a common bean, and then boil it briskly for fifteen or twenty minutes. Strain the starch through a cloth and use it while hot, rubbing it in well. Dry the goods, and afterward dampen them, letting them lie two or three hours; then iron with a hot flat-iron, and this will produce a most beautiful gloss. This gloss far exceeds the usual glossy appearance of linen as produced in the ordinary method of starching.

My starch-polish preserves the goods instead of rotting them. It is well known that starch rots the goods after starching and laying aside for a while.

Having thus fully described my invention, what I claim as new, and desire to secure by Letters Patent, is—

The starch-polish compound of white wax, spermaceti, castor-oil, mutton-tallow, borax, salt, gum-arabic, and isinglass, substantially as described, and for the purpose specified.

In witness that I claim the foregoing, I have hereunto set my hand and seal this 7th day of April, 1874.

WILLIAM J. BURLEIGH. [L. S.]

Witnesses:
 R. M. GREMS,
 B. BUTLER KENYON.